(12) United States Patent
Kim

(10) Patent No.: US 8,807,772 B2
(45) Date of Patent: Aug. 19, 2014

(54) BACKLIGHT UNIT, DISPLAY DEVICE THEREWITH, AND LIGHTING SYSTEMS THEREWITH

(75) Inventor: Tae Hoon Kim, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 256 days.

(21) Appl. No.: 13/369,111

(22) Filed: Feb. 8, 2012

(65) Prior Publication Data

US 2012/0140444 A1    Jun. 7, 2012

(30) Foreign Application Priority Data

Nov. 2, 2011  (KR) .................... 10-2011-0113545

(51) Int. Cl.
*G09F 13/04* (2006.01)
*G09F 13/08* (2006.01)

(52) U.S. Cl.
USPC ........................................ 362/97.1; 362/97.3

(58) Field of Classification Search
CPC .............. G02F 1/33603; G02F 11/133604; G02F 1/133606; G02F 1/133605; G02F 1/133608
USPC ........ 362/97.1, 611, 97.2, 97.3, 97.4; 349/64; 108/23

See application file for complete search history.

(56) References Cited

U.S. PATENT DOCUMENTS

| | | | | |
|---|---|---|---|---|
| 5,136,483 | A | * 8/1992 | Schoniger et al. | ............ 362/545 |
| 2011/0222267 | A1 | * 9/2011 | Park et al. | .................... 362/97.1 |
| 2012/0287348 | A1 | * 11/2012 | Kuromizu | ..................... 348/725 |

* cited by examiner

*Primary Examiner* — Nimeshkumar Patel
*Assistant Examiner* — Glenn Zimmerman
(74) *Attorney, Agent, or Firm* — Birch, Stewart, Kolasch & Birch, LLP

(57) ABSTRACT

Embodiments relate to a backlight unit, a display device therewith, and a lighting system therewith, the backlight unit including a first reflector and a second reflector, at least one light source disposed between the first reflector and the second reflector, an upper cover plate and a lower cover plate separate from each other, and a heat dissipation unit for holding the light source and being disposed between the upper cover plate and the lower cover plate to dissipate heat from the light source.

20 Claims, 12 Drawing Sheets

--PRIOR ART--

BACKLIGHT UNIT, DISPLAY DEVICE THEREWITH, AND LIGHTING SYSTEMS THEREWITH

CROSS REFERENCE TO RELATED APPLICATION

This application claims priority under 35 U.S.C. §119 to Korea Application No. 10-2011-0113545 filed in Korea on Nov. 2, 2011, which is hereby incorporated in its entirety by reference as if fully set forth herein.

TECHNICAL FIELD

The present invention relates to display devices, and more particularly to a backlight unit, a display device therewith, and a lighting system therewith.

BACKGROUND

In typical large sized display devices, there are LCD (Liquid Crystal Display device) and PDP (Plasma Display Panel).

Different from the PDP which is a spontaneous emission type, the LCD, having no light emitting device for itself, requires a separate backlight unit, essentially.

Depending on a position of a light source, in the backlight units used in the LCD, there are an edge type backlight unit and a direct type backlight unit. The edge type backlight unit has the light source disposed at left/right sides or upper/lower sides of an LCD panel, and a light guide plate for uniform diffusion of a light throughout the panel to have good uniformity of the light and to enable to fabricate an extra thin panel.

The direct type, a technology generally applied to a display device larger than 20", has a plurality of light sources disposed on an underside of the panel, to have better light efficiency than the edge type, finding its application to a large sized display device which requires high brightness.

As the light source for the related art edge type or the direct type backlight unit, CCFL (Cold Cathode Fluorescent Lamp) has been used.

However, the backlight unit of the CCFL has drawbacks in that a substantial amount of power is consumed by the CCFL since the CCFL requires the power applied thereto always, a color reproduction ratio is poor to be about 70% of the CRT, and environmental pollution is caused by mercury added thereto.

In order to resolve above problems, as a substitute for the CCFL, active researches on a backlight unit of LED (Light Emitting Diode) are being made, presently.

The backlight unit of LED enables partial turn on/off of an LED array to permit significant reduction of power consumption, and the backlight unit of R,G,B LED provides color reproduction exceeding 100% of the color reproduction range specification of the NTSC (National Television System Committee), thereby allowing providing an excellent picture quality to the consumers.

Moreover, the LED fabricated by a semiconductor process is not harmful to the environment.

Though there are LCD products having the LED applied thereto with above advantages being released all the time, since a driving mechanism thereof is different from the related art CCFL light source, drivers, PCB (Printed Circuit Board), and the like are expensive.

Accordingly, the LED backlight unit is applied to expensive LCD products only, yet.

FIG. 1 illustrates a cross-sectional view of a related art two edge type backlight unit.

Referring to FIG. 1, the backlight unit is provided with an optical member 10, a cover plate (Or, heat bar) 20, first and second reflectors 30 and 32, a light source module 40 having a light source 42 and a circuit board 44, and a bottom chassis 50 for supporting the second reflector 32.

The cover plate 20 holds the light source module 40, and has a connection portion 24 coupled to a connection portion of the bottom chassis 50. And, the cover plate 20 dissipates heat from the light source module 40 to an outside of the backlight unit through heat dissipation fins 22. The optical member 10 is placed on the cover plate 20.

Consequently, the related art backlight unit has a problem in that the heat from the light source module 40 is transferred to the optical member 10 through the cover plate 20, to deform the optical member 10.

And, the first reflector 30 is attached to a part of the cover plate 20 adjacent to the light source module 40. Since the part of the cover plate 20 to which the first reflector 30 is attached is narrow and recessed, with making attachment of the first reflector 30 difficult, the working efficiency is poor.

SUMMARY OF THE DISCLOSURE

Embodiments are to provide backlight unit having the structure which may resolve deformation of an optical member caused by heat from a light source and make the attachment of a first reflector easy, and making the fabrication of the bottom chassis simple; a display device therewith, and a lighting system therewith.

In one embodiment, a backlight unit includes a first reflector and a second reflector, an upper cover plate having first and second regions adjacent to each other in a horizontal direction for holding the first reflector at the second region, a lower cover plate disposed opposite to and separate from the first region of the upper cover plate, at least one light source disposed between the upper cover plate and the lower cover plate, and a heat dissipation unit for holding the light source and being disposed between the upper cover plate and the lower cover plate to dissipate heat from the light source.

The backlight unit further includes a supporting unit adjacent to the lower cover plate for supporting the second reflector.

The heat dissipation unit includes an upper side being in contact with the upper cover plate at the first region, a lower side being in contact with an upper side of the lower cover plate, and an inner side being in contacting with the upper side and the lower side of the heat dissipation unit and for holding the light source.

For example, the upper cover plate is formed of an insulating material. The lower cover plate is unitary with the supporting unit or is separate from the supporting unit.

The backlight unit further includes a thermal pad disposed between the light source and the heat dissipation unit.

The heat dissipation unit includes a plurality of heat dissipation protrusion lines disposed at a center region having the light source positioned therein. The heat dissipation unit includes a plurality of heat dissipation protrusion lines disposed at a peripheral region adjacent to the center region. Each of the plurality of heat dissipation protrusion lines has a cross-sectional area which becomes the smaller as the cross-sectional area becomes the farther from the light source. The heat dissipation protrusion line close to the light source has a cross-sectional area larger than a cross-sectional area of the heat dissipation protrusion line far from the light source. The heat dissipation protrusion line close to the light source has a height higher than a height of the heat dissipation protrusion line far from the light source.

The backlight unit further includes an optical member opposite to the second reflector and supported by the upper cover plate. The upper cover plate includes a first protrusion portion. The first protrusion portion includes a first protrusion body having a protrusion in a first direction, and a first connection body having an extension from the first protrusion body in a second direction different from the first direction. The optical member is coupled to and secured to a slot formed by the first protrusion portion.

The upper cover plate includes at least one first support protrusion line formed at an edge of the upper cover plate, and a second support protrusion line disposed adjacent to the edge and spaced from the first support protrusion line. The optical member is supported by the first support protrusion line and the second support protrusion line. The first support protrusion line has a height lower than the second support protrusion line. The first support protrusion line has a flat or curved upper surface. The first support protrusion line includes at least one buffering recess in the upper surface. The optical member includes a coupling groove and the upper cover plate includes a coupling protrusion for coupling to the coupling groove.

At least one of the upper cover plate or the lower cover plate includes a second protrusion portion, The second protrusion portion includes a second protrusion body having a protrusion in a third direction; and a second connection body having an extension from the second protrusion body in a fourth direction different from the third direction. The heat dissipation unit includes a third protrusion portion, and the third protrusion portion includes a third protrusion body having a protrusion in the third direction and a third connection body having an extension from the third protrusion body in the fourth direction. The heat dissipation unit at the third protrusion portion is engaged with at least one of the upper cover plate or the lower cover plate at the second protrusion portion.

The second protrusion portion is engaged with the third protrusion portion with a gap therebetween such that the heat dissipation unit is slidable between the upper cover plate and the lower cover plate.

BRIEF DESCRIPTION OF THE DRAWINGS

Arrangements and embodiments may be described in detail with reference to the following drawings in which like reference numerals refer to like elements and wherein.

DETAILED DESCRIPTION

Hereinafter, embodiments will be described with reference to the annexed drawings.

It will be understood that when an element is referred to as being 'on' or "under" another element, it can be directly on/under the element, and one or more intervening elements may also be present. When an element is referred to as being 'on' or 'under', 'under the element' as well as 'on the element' can be included based on the element.

A thickness or size of an element shown in a drawing may be exaggerated, omitted or shown schematically for convenience or clarity of description. And, the size of the element may not be shown to scale, perfectly.

Figure 2:
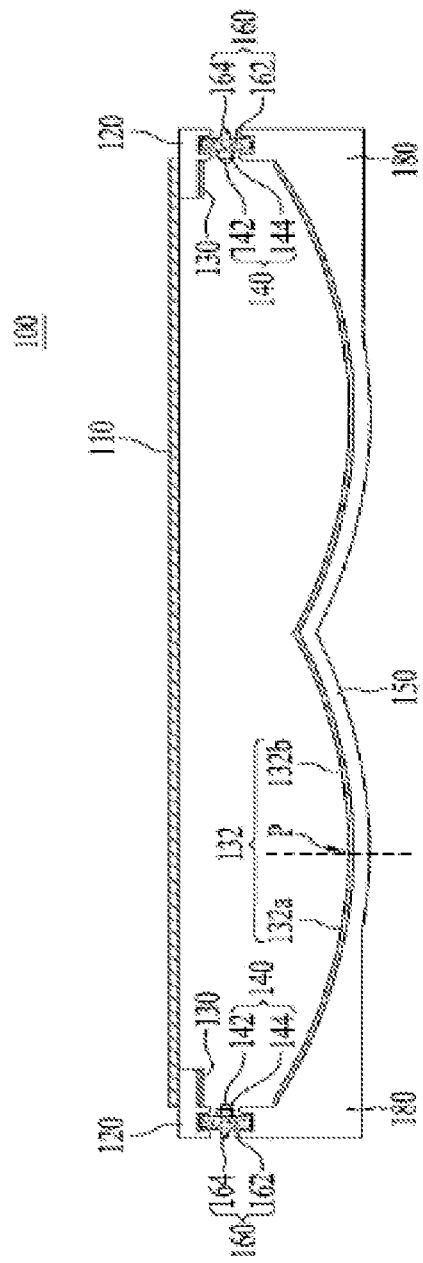
FIG. 2 illustrates a cross-sectional view of a backlight unit in accordance with an embodiment.

FIG. 2 illustrates a cross-sectional view of a backlight unit in accordance with an embodiment.

Referring to FIG. 2, the backlight unit 100 may include an optical member 110, upper and lower cover plates 120 and 180, first and second reflectors (Or, reflective layers) 130 and 132, a light source module 140, a supporting unit (Or, a bottom chassis) 150, and a heat dissipation unit 160.

The light source module 140 may be disposed between the first reflector 130 and the second reflector 132 and be adjacent to the first reflector 130.

And, the light source module 140 may include a light source 142 for generating a light, and a circuit board 144 having an electrode pattern.

A light emitting device of the light source 142 may be an LED chip of a blue LED chip, a UV LED chip, or at least one or a package having a combination of a red LED chip, a green LED chip, a blue LED chip, a yellow-green LED chip, or a white LED chip.

And, the white LED may be embodied by a combination of yellow phosphor on the blue LED, or a combination of red phosphor and green phosphor on the blue LED at a time.

In this instance, at least one light emitting device 142 may be mounted on the circuit board 144. And, an adapter (Not shown) for supplying power and an electrode pattern (Not shown) for connecting the light emitting device 142 may be mounted on the circuit board 144.

For example, a carbon nanotube electrode pattern (Not shown) may be formed on an upper surface of the circuit board 144 for connection of the adapter to the light emitting device 142.

The circuit board 144 may be a Printed Circuit Board PCB, on which a plurality of light source 142 is mounted, or a film of a material selected from polyethyleneterephthalate PET, glass, polycarbonate PC, and Si.

Moreover, the circuit board 144 may be one selected from a single layered PCB, a multiple layered PCB, a ceramic PCB, and a metal core PCB.

The light source 142 is disposed to be spaced a first distance from the first reflector 130, and a second distance from the second reflector 132. In this instance, the second distance may be larger than the first distance. That is, a gap between the second reflector 132 and the light source module 140 may be larger than a gap between the first reflector 130 and the light source module 140. This is for making the light from the light source module 140 to be focused at a central region of the second reflector 132 to increase brightness of the central region of the backlight unit 200.

And, a light emitting surface of the light source module 140 may be disposed in different directions. That is, the light source module 140 may be a direct emitting type in which the light emitting surface of the light source module 140 is arranged to face an air guide between the optical member 110 and the second reflector 132. Otherwise, the light source module 140 may be an indirect emitting type in which the light emitting surface of the light source module 140 is arranged to face any one of the first reflector 130, the second reflector 132, and the upper cover plate 120.

In this instance, a light emitted from the indirect emitting type light source module 140 may be reflected at the first reflector 130, the second reflector 132, and the upper cover plate 120. And the reflected light may again travel toward the air guide of the backlight unit 200. The light source module 140 is arranged in the indirect emitting type thus, for reducing a hot spot.

In order to have an air guide in an empty space between the first reflector 130 and the second reflector 132, the first reflector 130 and the second reflector 132 may be disposed opposite to each other and spaced by a predetermined distance from each other.

In this instance, the first reflector 130 may be disposed to be spaced by a predetermined distance from the light source module 140 to have an open region.

And, the first reflector 130 may be a reflective coating film or a reflective coating material layer, for reflecting the light emitted from the light source module 140 toward the second reflector 132.

And, the first reflector 130 may have a saw-tooth shaped reflective pattern formed on a surface thereof opposite to the light source module 140, and the surface of the reflective pattern may be flat or curved.

The reflective pattern is formed on the surface of the first reflector 130 for reflecting the light emitted from the light source module 140 to the central region of the second reflector 132 to increase brightness of the central region of the backlight unit 100.

The second reflector 132 is disposed to be spaced by a predetermined gap from the light source module 140 and may have a surface sloped at an angle from a horizontal plane parallel to the surface of the first reflector 130.

In this instance, the sloped surface of the second reflector 132 may serve to reflect the light emitted from the light source module 140 or the light reflected at the first reflector 130 toward the open region of the first reflector 130.

And, the second reflector 132 may include at least two first and second sloped surfaces 132a and 132b adjacent to each other at least one inflection portion P. Radii of curvatures of first and second sloped surfaces 132a and 132b adjacent may differ from each other.

The inflection portion P between the first and second sloped surfaces 132a and 132b may be disposed at a region of the second reflector 132 adjacent to the light source 142. This is because the curvature of the first sloped surface 132a adjacent to the light source 142 is smaller than the curvature of the second sloped surface 132b.

The second reflector 132 may be one of a reflective coating film and a reflective coating material layer.

The supporting unit 150 which supports the second reflector 132 may have an inner surface. The radius of curvature of the inner surface may be equal to that of a bottom surface of the second reflector 132, for forming the aforementioned air guide when the second reflector 132 in a form of the reflective coating film is attached to the inner surface of the supporting unit 150. That is, the supporting unit 150 may be fabricated to have at least two first and second sloped surfaces adjacent to each other about the inflection portion. Radii of curvatures of two first and second sloped surfaces may differ from each other.

And, the supporting unit 150 may be formed of polymer, such as plastic, for making injection molding possible.

In the meantime, the optical member (Or, optical sheet) 110 may be arranged to be supported by the upper cover plate 120 and to be opposite to the second reflector 132. The optical member 110 has at least one sheet, selectively including a diffusion sheet, a prism sheet, a brightness enhancement sheet, and a lenticular sheet. The diffusion sheet diffuses the light emitted from the light source 142, the prism sheet guides the diffused light to a light forwarding region, and the brightness enhancement sheet enhances brightness of the light. And, the optical member 110 may have a rough surface for uniform diffusion of the light.

Next, the heat dissipation unit 160 is disposed between the upper cover plate 120 and the lower cover plate 180, to hold the light source module 140, to support the upper cover plate 120, and to dissipate heat from the light source module 140. That is, the lower cover plate 180 supports the heat dissipation unit 160, and the heat dissipation unit 160 supports the upper cover plate 120. The upper cover plate 120 and the lower cover plate 180 are separate from each other.

Figure 3A:
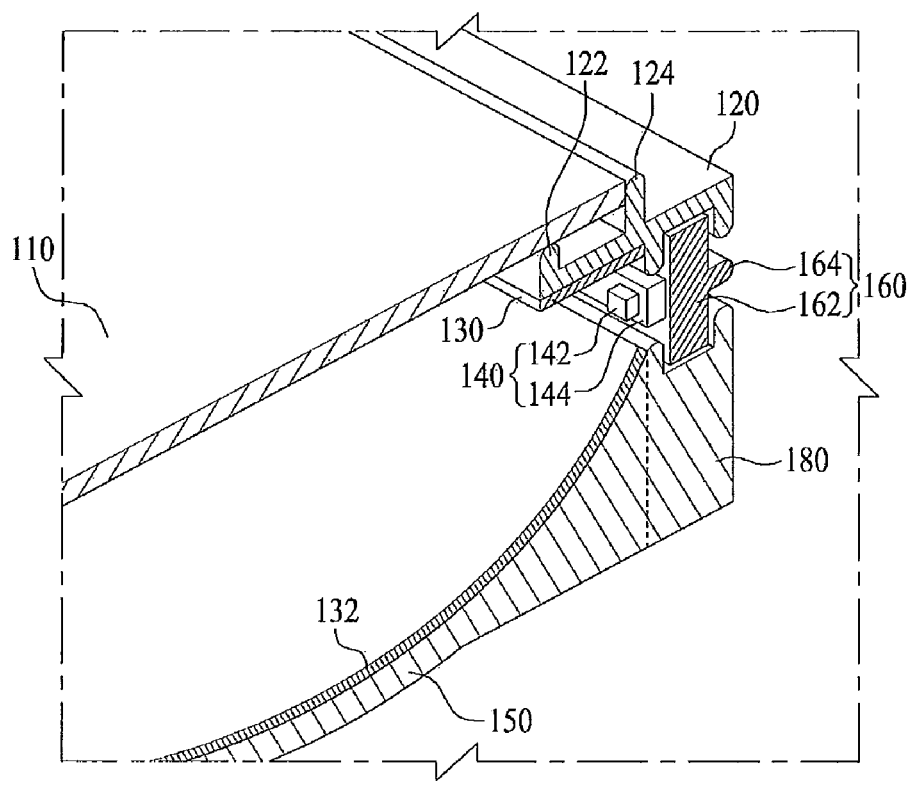
FIGS. 3A and 3B illustrate cross-sectional views each showing upper and lower cover plates, an optical member and a heat dissipation unit coupled to one another in accordance with an embodiment.
Figure 3B:
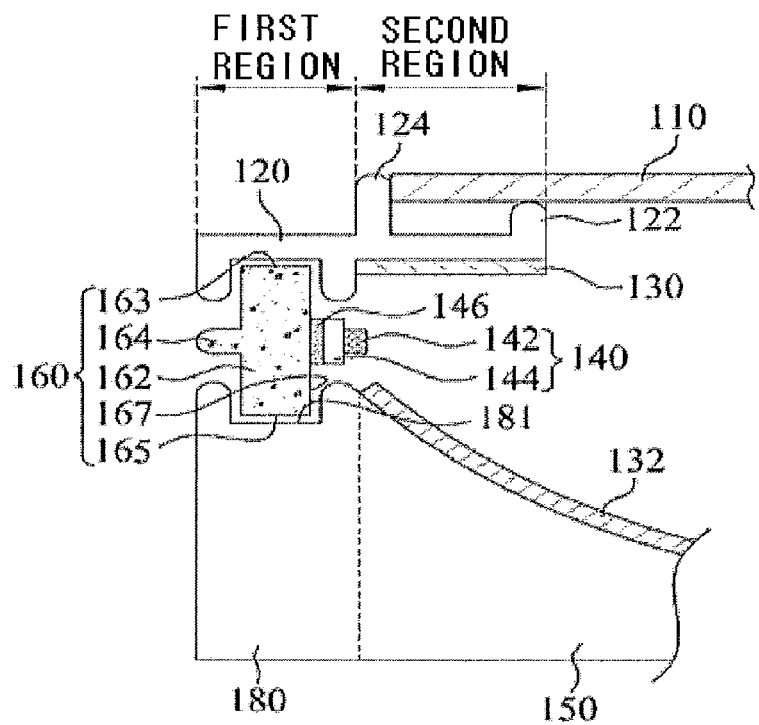

FIGS. 3A and 3B illustrate cross-sectional views each showing upper and lower cover plates 120 and 180, an optical member 110 and a heat dissipation unit 160 coupled to one another in accordance with an embodiment. In detail, FIG. 3A illustrates a perspective view showing the upper and lower cover plates 120 and 180, the optical member 110 and the heat dissipation unit 160 coupled together. FIG. 3B illustrates a cross-sectional view of the upper and lower cover plates 120 and 180, the optical member 110 and the heat dissipation unit 160 coupled together.

Referring to FIGS. 3A and 3B, according to the embodiment, the upper cover plate 120 has first and second regions adjacent in a horizontal direction. The upper cover plate 120 is covered with the first reflector 130 at the second region. Thus, the upper cover plate 120 holds the first reflector 130.

Figure 1:
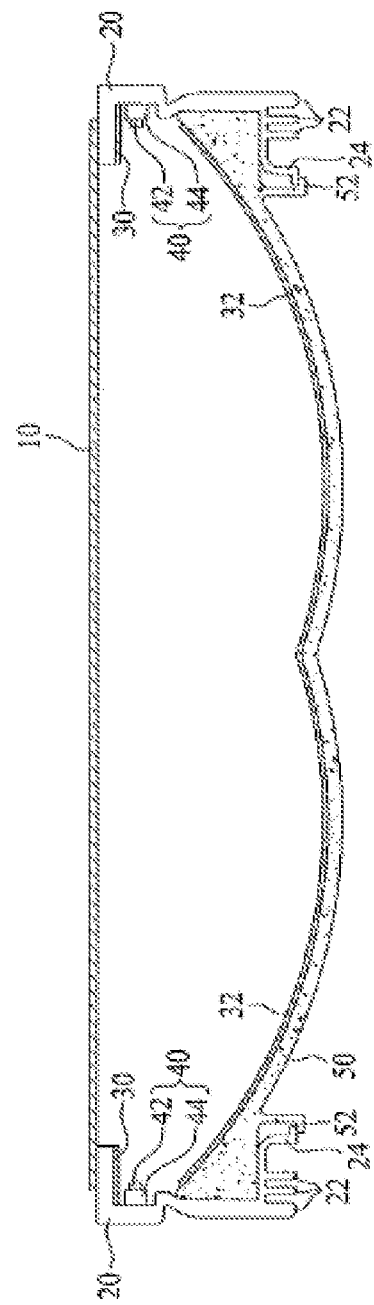
FIG. 1 illustrates a cross-sectional view of a related art two edge type backlight unit.

According to this, in a fabrication process of the backlight unit, the first reflector 130 may be easily attached to the upper cover plate 120. This is because the upper cover plate 120 to which the first reflector 130 is attached has a straight structure, not a bent structure, differently from a structure of the cover plate 20 shown in FIG. 1.

And, the lower cover plate 180 is adjacent to the supporting unit 150, and parallel to the first region of the upper cover plate 120 spaced therefrom.

The light source module 140 may be disposed between the upper cover plate 120 and the lower cover plate 180 and between the upper cover plate 120 and the supporting unit 150, or only between the upper cover plate 120 and the lower cover plate 180, or only between the upper cover plate 120 and the supporting unit 150.

The heat dissipation unit 160 includes an upper side 163, a lower side 165, and an inner side 167. The upper side 163 is in contact with the upper cover plate 120 at the first region thereof. The lower side 165 is in contact with an upper side 181 of the lower cover plate 180. The inner side 167 is in contact with the upper side 163 and the lower side 165 of the heat dissipation unit 160, and holds the light source 144.

And, the backlight unit in accordance with an embodiment may further include a thermal pad 146. The thermal pad 146 is held by the inner side 167 of the heat dissipation unit 160. And, the thermal pad 146 is disposed between the light source module 140 and the heat dissipation unit 160, for making the light source module 140 held by the heat dissipation unit 160, and transferring the heat from the light source module 140 to the heat dissipation unit 160.

And, the upper cover plate 120 includes at least one first support protrusion line 122 and a second support protrusion line 124.

At least one first support protrusion line 122 may be disposed at an edge region of the upper cover plate 120, and at least one second support protrusion line 124 may be disposed at a region adjacent to the edge, not at an edge, and be spaced from the first support protrusion line 122.

Referring to FIGS. 3A and 3B, the optical member 110 is supported by the first and second protrusion lines 122 and 124. It is preferable that the first support protrusion line 122 has a height lower than the second support protrusion line 124. This is because the first support protrusion line 122 serves to support the optical member 110 and the second support protrusion line 124 adjacent thereto serves as a stopper which holds the optical member 110, securely.

FIGS. 4A-4D illustrate schematic views each showing a top surface of the first supporting protrusion line 122 in FIGS. 3A and 3B.

The top surface of the first support protrusion line 122 may be flat or curved.

Figure 4A:
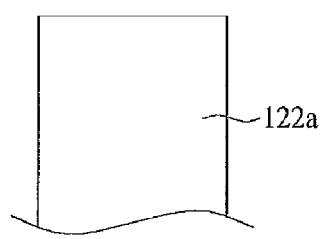
FIGS. 4A~4D illustrate schematic views each showing the upper surface of the first supporting protrusion line in FIGS. 3A and 3B.
Figure 4B:
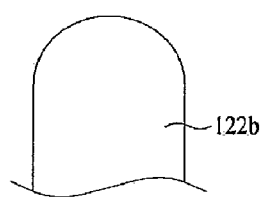

Referring to FIG. 4A, the top surface of the first support protrusion line 122a may be flat, or, as shown in FIG. 4B, the top surface of the first support protrusion line 122b may be curved.

Since the first support protrusion line 122 is required to support the optical member 110, and it is preferable to reduce a contact area with the optical member 110 as far as possible, it is favorable that the top surface is curved 122b.

Figure 4C:
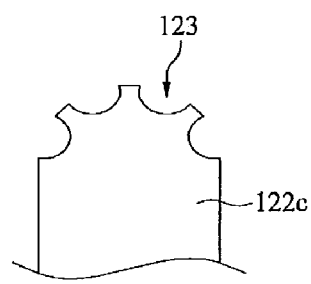

Depending on cases, referring to FIG. 4C, in order to reduce the area contacted with the optical member 110 more, buffering recess 123 may be further formed in the top surface of the first support protrusion line 122.

Figure 4D:
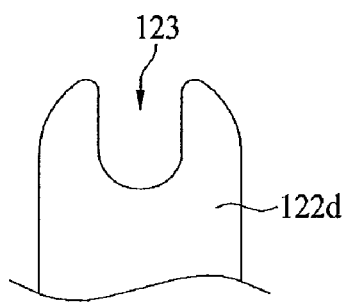

The buffering recess 123 in the top surface of the first support protrusion line 122 may be plural as shown in FIG. 4C, or singular as shown in FIG. 4D.

Alike the first support protrusion line 122, the second support protrusion line 124 may have a top surface as shown in FIGS. 4A to 4D. This is because the display panel (Not shown) may be placed on the top side of the second support protrusion line 124.

Figure 5:
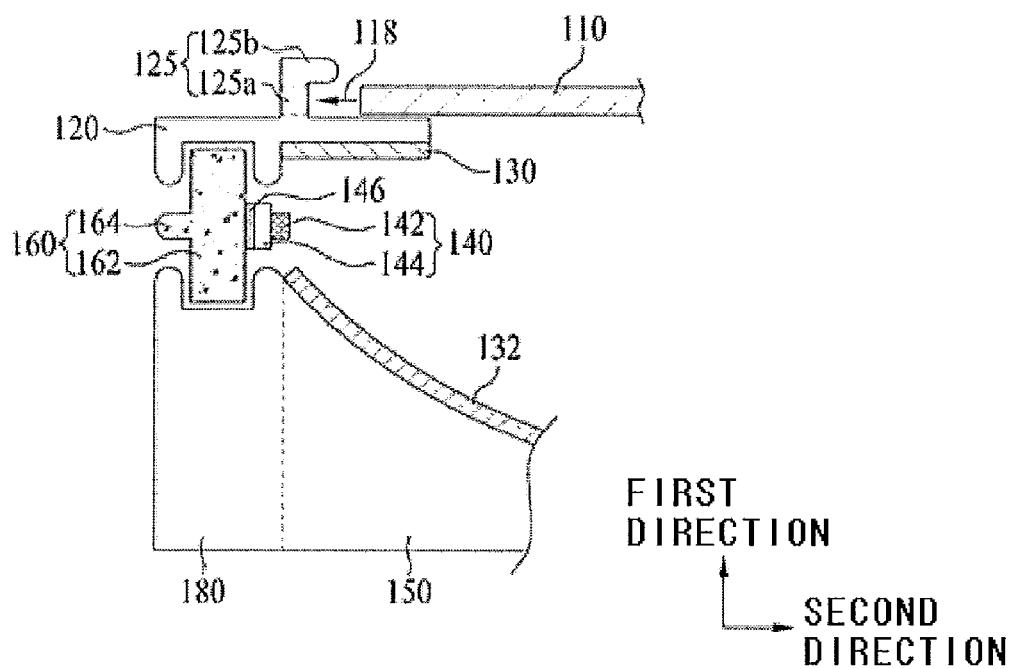
FIG. 5 illustrates a cross-sectional view of a backlight unit in accordance with another embodiment.

FIG. 5 illustrates a cross-sectional view of a backlight unit in accordance with another embodiment.

Referring to FIG. 5, in another embodiment, the upper cover plate 120 may include a first protrusion portion 125 for securing the optical member 110.

The first protrusion portion 125 includes a first protrusion body 125a and a first connection body 125b.

The first protrusion body 125a has a protrusion in a first direction, and the first connection body 125b has an extension from the first protrusion body 125a in a second direction different from the first direction.

The optical member 110 may be placed in a slot formed by the first protrusion body 125a and the first connection body 125b in an arrow direction 118, and secured thereto.

Figure 6:
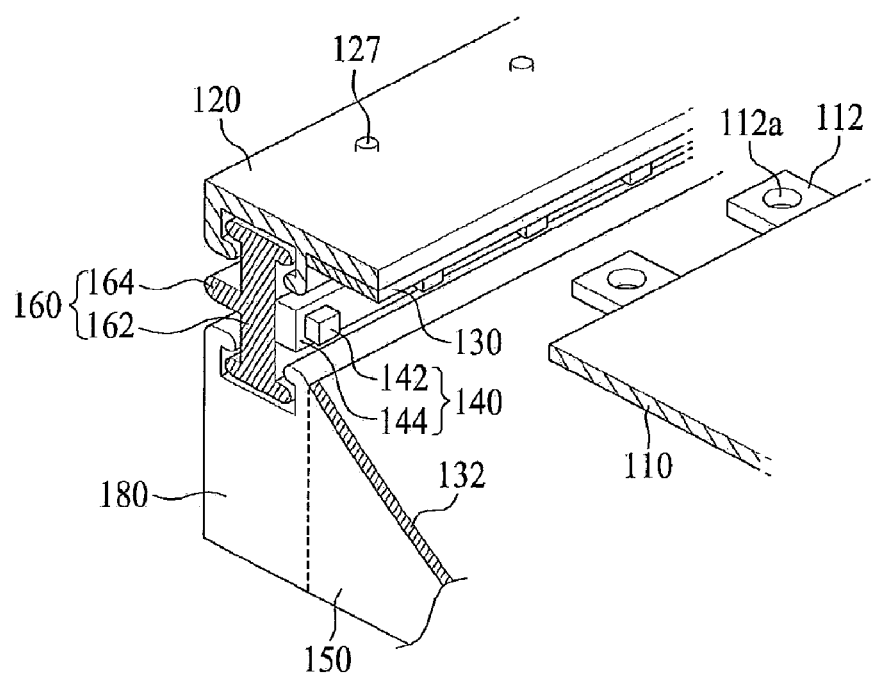
FIG. 6 illustrates a cross-sectional view of a backlight unit in accordance with another embodiment.

FIG. 6 illustrates a cross-sectional view of a backlight unit in accordance with another embodiment.

In another embodiment, the optical member 110 includes a coupling member 112, and the upper cover plate 120 includes a coupling protrusion 127 protruded from the top surface for coupling to the coupling member 112.

Accordingly, referring to FIG. 6, the optical member 110 may be secured to the upper cover plate 120 by inserting the coupling protrusion 127 into a coupling groove 112a formed in the coupling member 112.

Referring to FIGS. 2, 3A, 3B, 5 or 6, the supporting unit 150 which supports the second reflector 132 may be formed as one unit with the lower cover plate 180.

Figure 7:
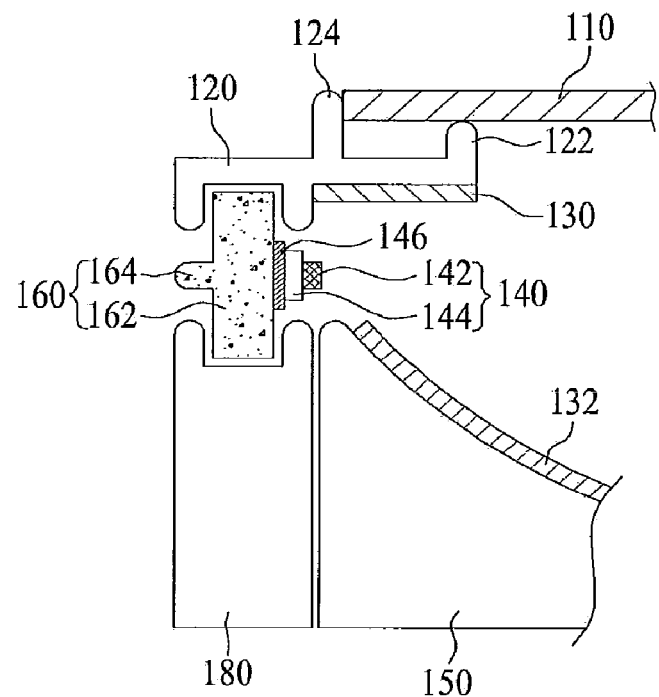
FIG. 7 illustrates a cross-sectional view of a backlight unit in accordance with another embodiment.

FIG. 7 illustrates a cross-sectional view of a backlight unit in accordance with another embodiment.

Referring to FIG. 7, in another embodiment, the lower cover plate 180 may not be unitary with, but be separate from, the supporting unit 150.

Figure 8:
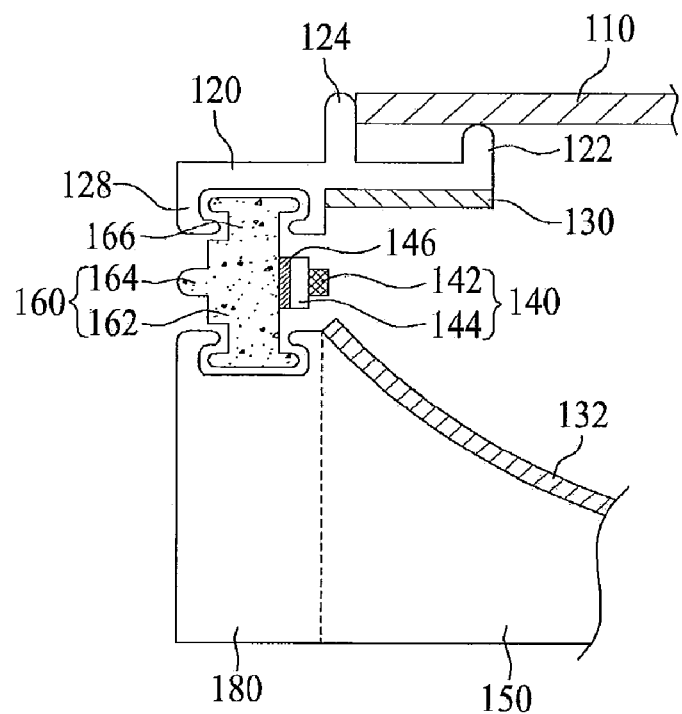
FIG. 8 illustrates a cross-sectional view of a backlight unit in accordance with another embodiment.

FIG. 8 illustrates a cross-sectional view of a backlight unit in accordance with another embodiment, and FIG. illustrates a partial enlarged view of the backlight unit in FIG. 8.

In another embodiment, at least one of the upper cover plate 120 or the lower cover plate 180 may include a second protrusion portion 128, and the heat dissipation unit 160 may include a third protrusion portion 166. Both the upper cover plate 120 and the lower cover plate 180 of the backlight unit in FIGS. 8 and 9 have the second protrusion portion 128. However, the embodiment is not limited to this, but only the upper cover plate 120 may include the second protrusion portion 128 or only the lower cover plate 180 may include the second protrusion portion 128.

The second protrusion portion 128 includes a second protrusion body 128a and a second connection body 128b. The second protrusion body 128a has a protrusion in a third direction, and the second connection body 128b has an extension from the second protrusion body 128a in a fourth direction different from the third direction.

The third direction may, or may not be a direction the same or different from the first direction shown in FIG. 5, and the fourth direction may, or may not be a direction the same or different from the second direction shown in FIG. 5. In this instance, directions having a phase difference of 180° are taken as the same directions.

The third protrusion portion 166 from the heat dissipation unit 160 includes a third protrusion body 166a and a third connection body 166b. The third protrusion body 166a has a protrusion in the third direction and the third connection body 166b has an extension from the third protrusion body 166a in the fourth direction.

Therefore, the heat dissipation unit 160 at the second protrusion portion 128 may be engaged with at least one of the upper cover plate 120 or the lower cover plate 180 at the third protrusion portion 166.

Figure 9:
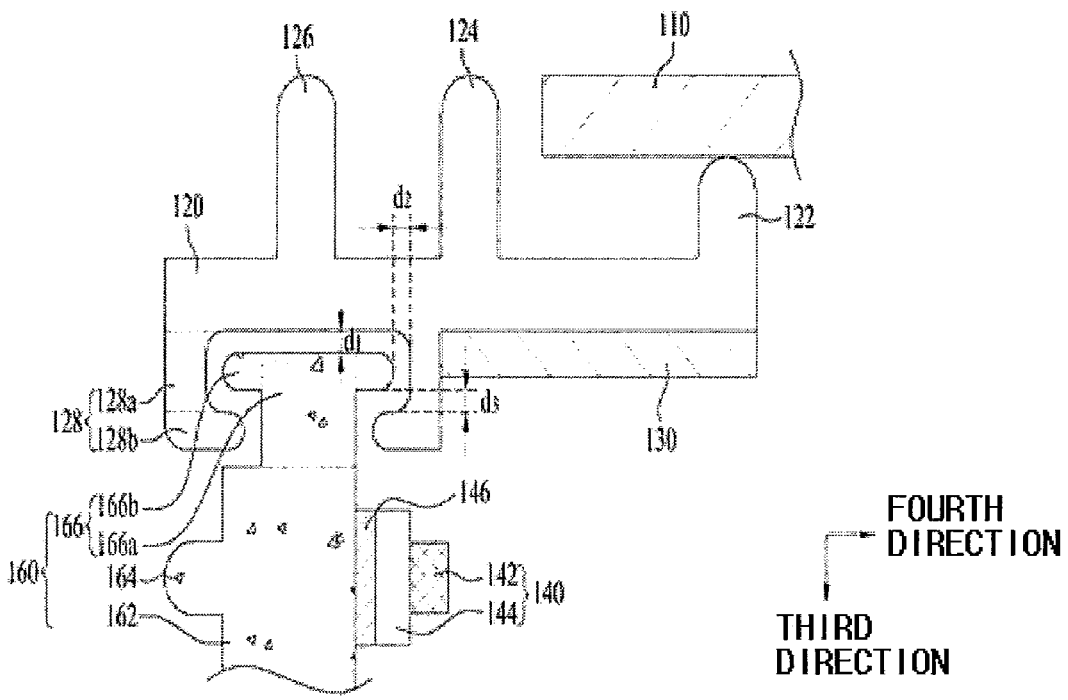
FIG. 9 illustrates a partial enlarged view of the backlight unit in FIG. 8.

FIGS. 8 and 9 illustrate schematic views of the backlight unit in accordance with embodiments having the heat dissipation unit 160 at the third protrusion portion 166 engaged with the upper and lower cover plates 120 and 180 at the second protrusion portion 128, respectively.

Moreover, the second and third protrusion portions 128 and 166 may be engaged with each other with a gap therebetween for allowing the heat dissipation unit 160 to slide between the upper cover plate 120 and the lower cover plate 180.

For example, referring to FIG. 9, the top surface of the heat dissipation unit 160 may be spaced a first distance d1 from an underside of the upper cover plate 120. And, an end portion of the third connection body 166b may be spaced a second distance d2 from an inner edge of the second protrusion body 128a. And, an underside edge of the third connection body 166b may be spaced a third distance d3 from an upper edge of the second connection body 128b.

Thus, since the heat dissipation unit 160 which holds the light source module 140 is slidable between the upper and lower cover plates 120 and 180, an initial process for assembling the heat dissipation unit 160 to the backlight unit or replacement of the light source module 140 held by the heat dissipation unit 160 made later may be made easily.

In the meantime, the heat dissipation unit 160 may include a heat dissipation body 162 and a plurality of heat dissipation protrusion lines 164.

The heat dissipation body 162 at a front surface thereof holds the light source module 140.

The plurality of heat dissipation protrusion lines 164 is protruded from a back side of the heat dissipation body 162 between the upper cover plate 120 and the lower cover plate 180 spaced from each other for dissipation of heat from the light source module 140.

Figure 10:
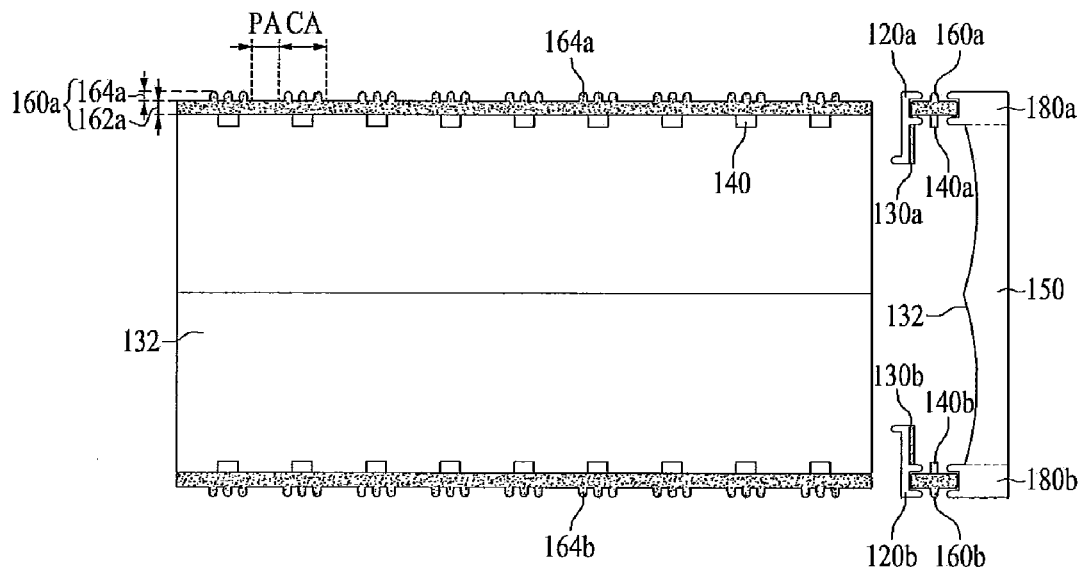
FIG. 10 illustrates a plan view showing a disposition of heat dissipation protrusion lines applied to a two edge type backlight unit in accordance with an embodiment.
Figure 11:
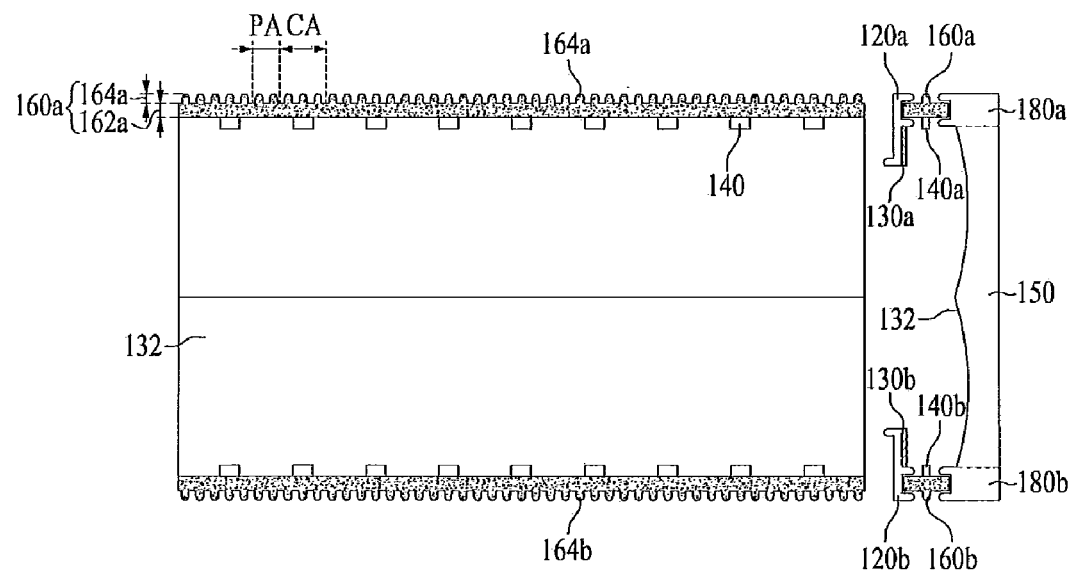
FIG. 11 illustrates a plan view showing a disposition of heat dissipation protrusion lines applied to a two edge type backlight unit in accordance with another embodiment.

FIGS. 10 and 11 illustrate plan views each showing a disposition of heat dissipation protrusion lines 164 applied to a two edge type backlight unit.

Referring to FIGS. 10 and 11, the backlight unit may have two first reflectors 103a and 130b and a second reflector 132 spaced from the two first reflectors 130a and 130b.

And, the light source module 140a may be disposed between the first and second reflectors 130a and 132, and the light source module 140b may be disposed between the first and second reflectors 130b and 132.

Then, the heat dissipation unit 160a is disposed between the upper cover plate 120a and the lower cover plate 180a, for holding the light source module 140a and dissipating heat from the light source module 140a. Similar to this, the heat dissipation unit 160b is disposed between the upper cover plate 120b and the lower cover plate 180b, for holding the light source module 140b and dissipating heat from the light source module 140b.

The heat dissipation unit 160a or 160b includes a center area CA and a peripheral area PA. The center area CA is defined as an area where the light source module 140a or 140b positions, and the peripheral area PA is defined as an area positioned between the center areas CAs.

Referring to FIG. 10, in the embodiment, the plurality of heat dissipation protrusion lines 164 is disposed only at the center area CA, but not at the peripheral area PA. This is for enhancing heat dissipation efficiency by using a simplified structure, because the heat is generated by the light source module 140a or 140b positioned at the center area CA.

Or, referring to 11, in another embodiment, the plurality of heat dissipation protrusion lines 164 may be disposed both at the center area CA and the peripheral area PA. In this case, the heat dissipation efficiency may be enhanced further though the structure is more or less complicate than the structure shown in FIG. 10.

Figure 12:
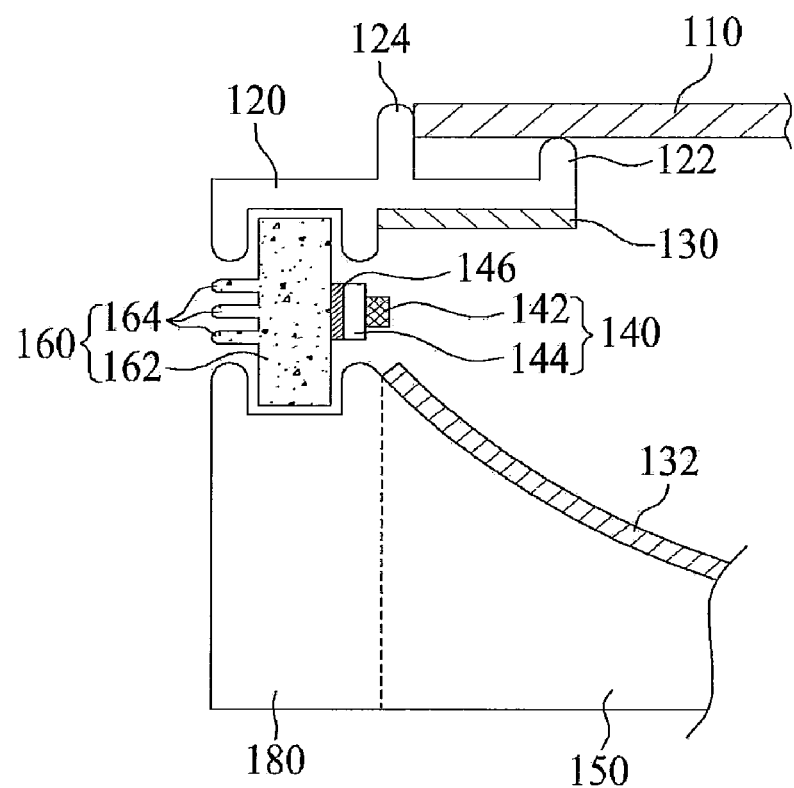
FIG. 12 illustrates a cross-sectional view of a backlight unit in accordance with another embodiment.

FIG. 12 illustrates a cross-sectional view of a backlight unit in accordance with another embodiment.

Referring to FIG. 12, in the embodiment, a plurality of heat dissipation protrusion lines 164A, 164B, and 164C may be disposed in a direction vertical to a direction in which the light source module 140 is disposed.

Figure 13:
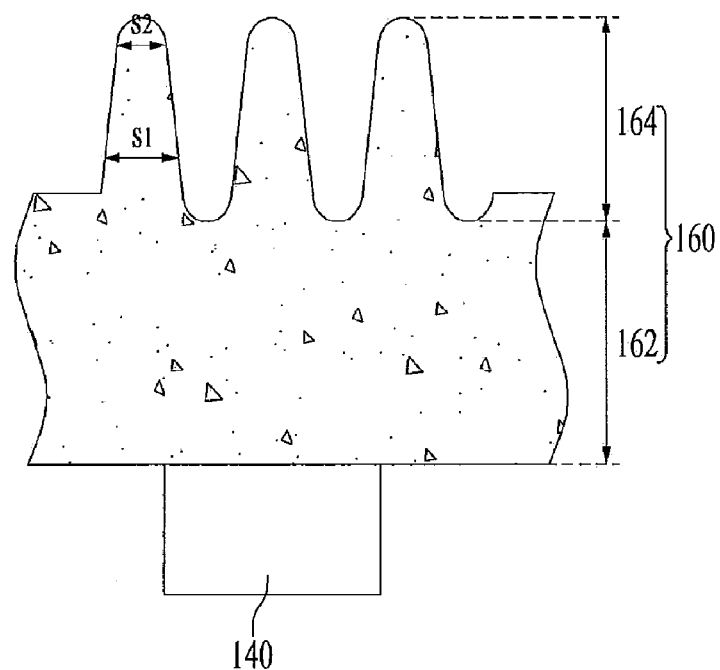
FIG. 13 illustrates a schematic view of a heat dissipation unit and a light source module in accordance with an embodiment.

FIG. 13 illustrates a schematic view of a heat dissipation unit 160 and a light source module 140 in accordance with an embodiment. That is, FIG. 13 may be a drawing which illustrates the heat dissipation unit 160 in FIG. 10 or 11 partially, or the heat dissipation unit 160 in FIG. 12, partially.

Referring to FIG. 13, in each of the heat dissipation protrusion lines 164, an area S1 of a first surface being in contact with the heat dissipation body 162 may differ from an area S2 of a second surface being opposite to the first surface. In this instance, the first surface is arranged closer to the light source module 140 than the second surface. For example, a cross-sectional area of each of the heat dissipation protrusion lines 164 may be reduced as the cross-sectional area is the farther from the light source module 140. That is, the area S1 of the first surface of each of the heat dissipation protrusion lines 164 may be larger than the area S2 of the second surface opposite to the first surface. This is because the heat may be transmitted from the light source module 140 as fast as possible.

Depending on cases, at least one of the heat dissipation protrusion lines 164 shown in FIG. 10, 11, or 12 may have a thickness or a height different from others.

Figure 14A:
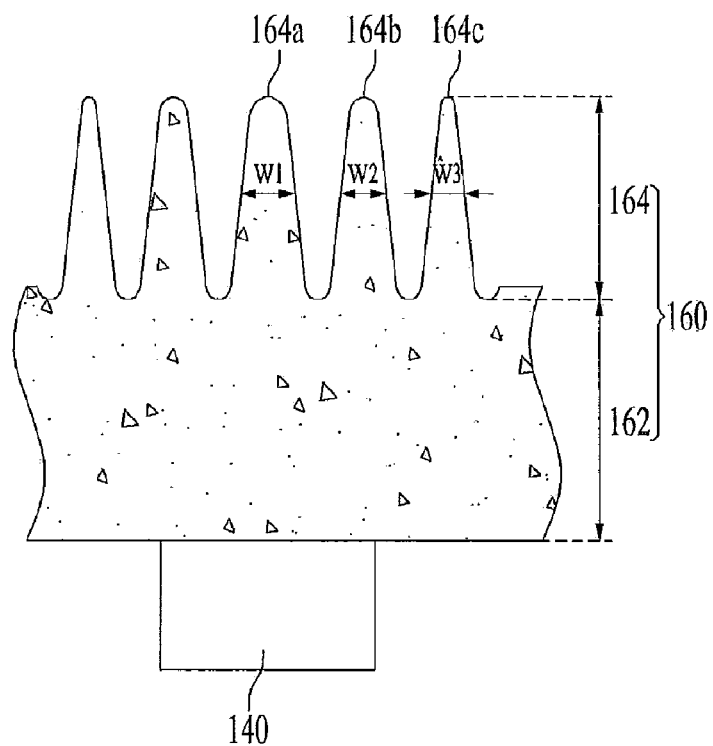
FIGS. 14A and 14B illustrate schematic views each showing a shape of the heat dissipation protrusion lines in accordance with embodiments.
Figure 14B:
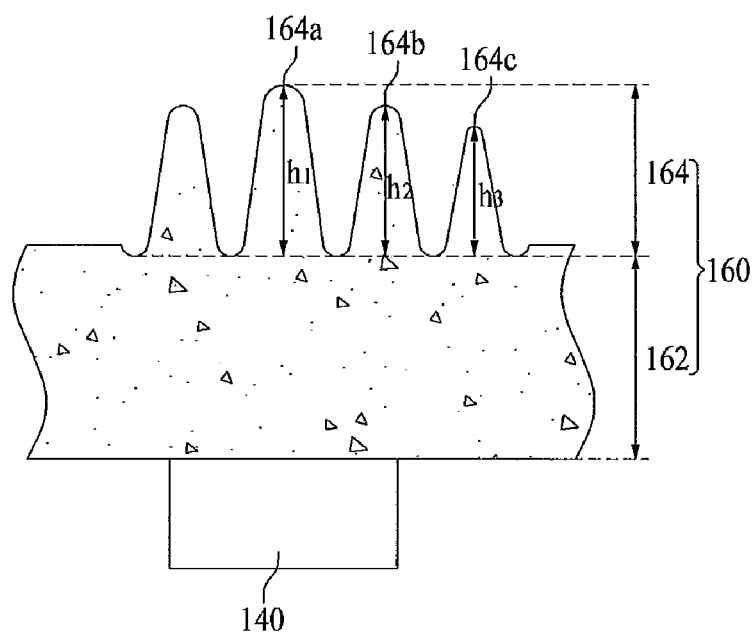

FIGS. 14A and 14B illustrate schematic views each showing a shape of the heat dissipation protrusion lines 164 in accordance with embodiments.

The cross-sectional area of the heat dissipation protrusion line positioned at a region closer to the light source module 140 may be larger than the cross-sectional area of the heat dissipation protrusion line positioned at a region far from the light source module 140.

For example, referring to FIG. 14A, among the plurality of heat dissipation protrusion lines 164A, 164B, and 164C, the heat dissipation protrusion line 164A close to the light source module 140 may have a thickness W1 thicker than a thickness W2 or W3 of the heat dissipation protrusion line 164B or 164C disposed far from the light source module 140. And, the thickness W2 of the heat dissipation protrusion line 164B disposed at a region close to the light source module 140 may be thicker than the thickness W3 of the heat dissipation protrusion line 164C disposed at a region far from the light source module 140.

And, referring to FIG. 14B, among the plurality of heat dissipation protrusion lines 164A, 164B, and 164C, the heat dissipation protrusion line 164A disposed at a region close to the light source module 140 may have a height h1 higher than a height h2 or h3 of the heat dissipation protrusion line 164B or 164C disposed at a region far from the light source module 140. And, the height h2 of the heat dissipation protrusion line 164B disposed at a region close to the light source module 140 may be higher than the height h3 of the heat dissipation protrusion line 164C disposed at a region far from the light source module 140.

The heat dissipation protrusion lines 164 are disposed thus for smooth discharge of the heat by enlarging a surface area of the heat dissipation protrusion line 164 disposed at a region, having a high temperature, close to the light source module 140.

The upper cover plate 120 may be formed of an insulating material, such as plastic. And, the lower cover plate 180 may be formed of a material, such as plastic and aluminum.

Therefore, the heat transmitted from the light source module 140 to the heat dissipation unit 160 is not transferred to the optical member 110 if the upper cover plate 120 is formed of the insulating material. Accordingly, the problem in the related art, such as deformation of the optical member 110 by the heat from the light source module 140 shown in FIG. 1, may be resolved.

Figure 15:
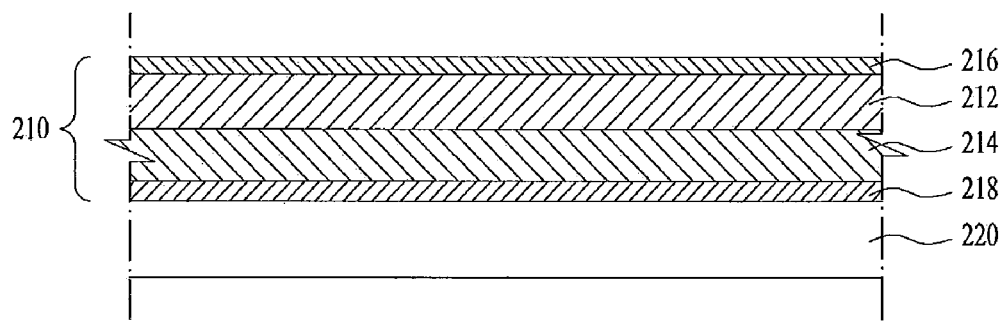
FIG. 15 illustrates a schematic view of a display module having a backlight unit in accordance with an embodiment applied thereto.

FIG. 15 illustrates a schematic view of a display module having a backlight unit in accordance with an embodiment.

Referring to FIG. 15, the display module 200 may include a display panel 210 and a backlight unit 220.

The display panel 210 may include a color filter substrate 212 and a TFT (Thin Film Transistor) substrate 214 bonded to face each other to maintain a uniform cell gap therebetween, with a liquid crystal layer (Not shown) disposed therebetween.

The color filter substrate 212 may include a plurality of pixels each having red R, green G, and blue B sub-pixels each for producing a red, green or blue image upon application of a light thereto.

Though each of the pixels may have the red R, green G, and blue B sub-pixels, each of the pixels may have, but not limited to, the red, green, blue, and white sub-pixels.

The TFT substrate 214 is a device having switching devices formed thereon for switching the pixel electrodes (Not shown).

For example, a common electrode (Not shown) and a pixel electrode may vary orientation of molecules in a liquid crystal layer with a predetermined voltage applied thereto from an outside.

The liquid crystal layer has a plurality of liquid crystal molecules of which orientation is varied according to a voltage difference between the pixel electrode and the common electrode.

Eventually, the light from the backlight unit 220 may be incident on the color filter substrate 212 matched to the variation of the orientation of the molecules of the liquid crystal layer.

And, the display panel 210 may have an upper polarizing plate 216 and a lower polarizing plate 218 disposed on an upper side and underside thereof, respectively. In more detail, the upper polarizing plate 216 may be disposed on the color filter substrate 212, and the lower polarizing plate 218 may be disposed on an underside of the TFT substrate 214.

Though not shown, there may be gate and data driving units on a side of the display panel 210 for generating driving signals required for driving the display panel 210.

Referring to FIG. 15, the display module 200 may be fabricated by disposing the backlight unit 220 close to the display panel 210.

For example, the backlight unit 220 may be secured to an underside of the display panel 210, more specifically, to the lower polarizing plate 218 with an adhesive. To do this, an adhesive layer (Not shown) may be formed between the lower polarizing plate 218 and the backlight unit 220.

Thus, by arranging the backlight unit 220 close to the display panel 210, an exterior of the display device may be improved by reducing a total thickness thereof, and a structure and a fabrication process of the display device may be simplified by removing additional structures required for securing the backlight unit 220 thereto.

And, by removing a space between the backlight unit 220 and the display panel 210, malfunction or a poor picture quality of the display device caused by infiltration of foreign matter into the space may be prevented.

Figure 16:
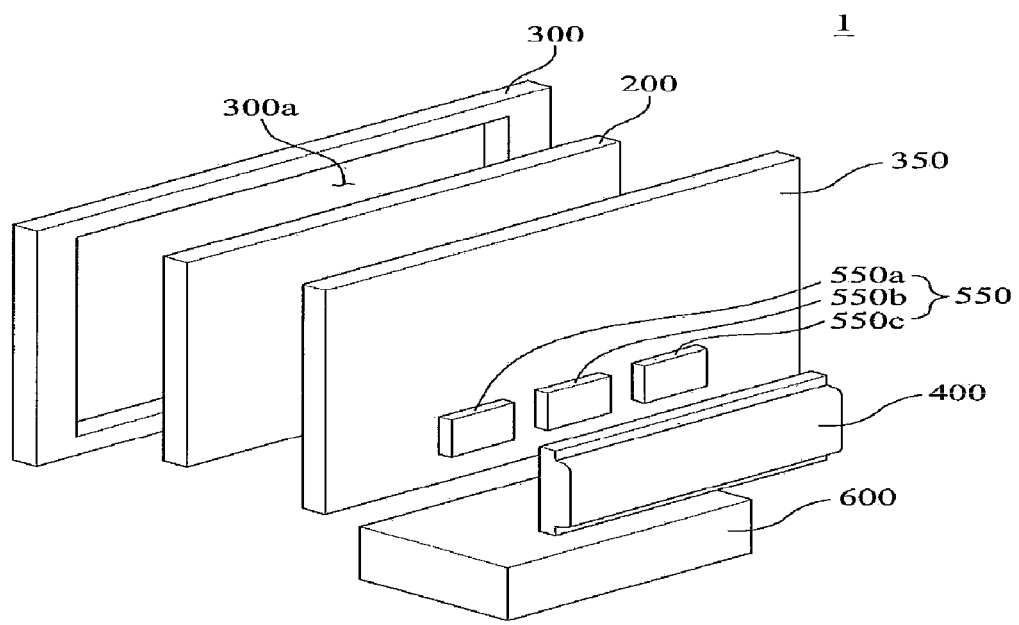
FIG. 16 illustrates a schematic view of a display device in accordance with an embodiment.
Figure 17:
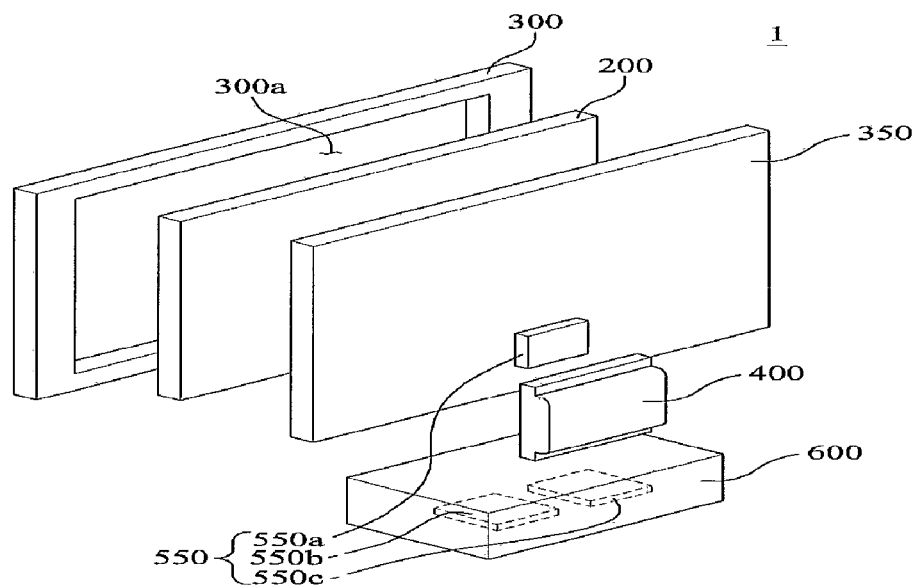
FIG. 17 illustrates a schematic view of a display device in accordance with another embodiment.

FIGS. 16 and 17 illustrate perspective views of display devices in accordance with embodiments, respectively.

Referring to FIG. 16, the display device 1 may include a display module 200, a front cover 300 and a back cover 350 which enclose the display module 200, a driving unit 550 provided to the back cover 350, and a driving unit cover 400 which covers the driving unit 550.

The front cover 300 may include a front panel (Not shown) of a transparent material which transmits a light, for protecting the display module 200 with a space therebetween, and transmitting the light from the display module 200 to let an image displayed on the display module 200 visible from an outside of the display device.

Or, the front cover 300 may be a flat plate without a window 300a.

In this case, the front cover 300 may be formed of a transparent material which transmits a light, for an example, by injection molding of plastic.

If the front cover 300 is formed of the flat plate thus, a frame may be removed from the front cover 300.

The back cover 350 is coupled to the front cover 300 for protecting the display module 200.

The driving unit 550 may be disposed on one side of the back cover 350.

The driving unit 550 may include a driving control unit 550a, a main board 550b, and a power supply unit 550c.

The driving control unit 550a may be a timing controller, i.e., a driving unit for controlling operation timing of various driver ICs of the display module 200. The main board 550b may be a driving unit for transmitting a V sync, an H sync, and R, G, B resolution signals to the timing controller. The power supply unit 550c may be a driving unit for applying power to the display module 200.

The driving unit 550 may be provided to the back cover 350 to be enclosed with the driving unit cover 400.

The back cover 350 may have a plurality of holes for connecting the display module 200 to the driving unit 550. A stand 600 may be provided for supporting the display device 1.

Referring to FIG. 17, the driving control unit 550a of the driving unit 550 may be provided to the back cover 350, and the main board 550b and the power supply board 550c may be provided in the stand 600.

And, the driving unit cover 400 may enclose the driving unit 550 provided on the back cover 350, only.

Though the embodiment has the main board 550b and the power supply board 550c provided individually, the main board 550b and the power supply board 550c may be unified as one unit, but a configuration thereof is not limited to this.

Since the embodiments dissipate heat from the light source with the heat dissipation unit supported by the upper cover plate and the lower cover plate which are separate from each other, and support the optical member with the upper cover plate of an insulating material, deformation of the optical member caused by heat from the light source may be resolved, and the upper cover plate having a structure which enables easy mounting of the first reflector may improve a fabrication efficiency, and enables to make an exterior of the bottom chassis simple.

As another embodiment, a display device, an indicating device, or a lighting system may be embodied, having the backlight unit described in the foregoing embodiments, for example, the first and second reflectors 130 and 132, and the light source module 140 applied thereto. For example, the lighting system may include lamps and street lights.

The lighting system may be used as a lighting lamp which obtains a light by focusing a plurality of LEDS, especially, as a buried light (Down light) buried in a ceiling or a wall of a building with an opening side of a shade thereof exposed.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A backlight unit, comprising:
a first reflector and a second reflector;
at least one light source disposed between the first reflector and the second reflector;
an upper cover plate and a lower cover plate separate from each other;
a heat dissipation unit for holding the light source and being disposed between the upper cover plate and the lower cover plate to dissipate heat from the light source, the heat dissipation unit being supported by the lower cover plate; and
an optical member supported by the upper cover plate,
wherein the light source includes a semiconductor light emitting device.

2. The backlight unit as claimed in claim 1, wherein the upper cover plate is formed of an insulating material.

3. The backlight unit as claimed in claim 1, further comprising a supporting unit for supporting the second reflector.

4. The backlight unit as claimed in claim 3, wherein the lower cover plate is unitary with, or separate from, the supporting unit.

5. The backlight unit as claimed in claim 1, further comprising a thermal pad disposed between the light source and the heat dissipation unit.

6. The backlight unit as claimed in claim 1, wherein the heat dissipation unit includes a plurality of heat dissipation protrusion lines disposed at least one of a center region having the light source positioned therein or a peripheral region adjacent to the center region.

7. The backlight unit as claimed in claim 6, wherein each of the plurality of heat dissipation protrusion lines has a cross-sectional area which becomes smaller as the cross-sectional area becomes farther from the light source.

8. The backlight unit as claimed in claim 6, wherein the heat dissipation protrusion line close to the light source has a cross-sectional area larger than a cross-sectional area of the heat dissipation protrusion line far from the light source.

9. The backlight unit as claimed in claim 6, wherein the heat dissipation protrusion line close to the light source has a height higher than a height of the heat dissipation protrusion line far from the light source.

10. The backlight unit as claimed in claim 1, wherein the optical member is opposite to the second reflector.

11. The backlight unit as claimed in claim 1, wherein the upper cover plate includes a first protrusion portion,
wherein the first protrusion portion includes:
a first protrusion body having a protrusion in a first direction; and
a first connection body having an extension from the first protrusion body in a second direction different from the first direction, and
wherein the optical member is coupled to and secured to a slot formed by the first protrusion portion.

12. The backlight unit as claimed in claim 1, wherein the upper cover plate includes:
at least one first support protrusion line formed at an edge of the upper cover plate; and
a second support protrusion line disposed adjacent to the edge and spaced from the first support protrusion line, and
wherein the optical member is supported by the first support protrusion line and the second support protrusion line.

13. The backlight unit as claimed in claim 12, wherein the first support protrusion line has a height lower than the second support protrusion line.

14. The backlight unit as claimed in claim 12, wherein the first support protrusion line has a flat or curved upper surface.

15. The backlight unit as claimed in claim 12, wherein the first support protrusion line includes at least one buffering recess in the upper surface.

16. The backlight unit as claimed in claim 1, wherein the optical member includes a coupling groove and the upper cover plate includes a coupling protrusion for coupling to the coupling groove.

17. The backlight unit as claimed in claim 1, wherein at least one of the upper cover plate or the lower cover plate includes a second protrusion portion,
wherein the second protrusion portion includes:
a second protrusion body having a protrusion in a third direction; and
a second connection body having an extension from the second protrusion body in a fourth direction different from the third direction,
wherein the heat dissipation unit includes a third protrusion portion,
wherein the third protrusion portion includes:
a third protrusion body having a protrusion in the third direction; and
a third connection body having an extension from the third protrusion body in the fourth direction, and
wherein the heat dissipation unit at the third protrusion portion is engaged with at least one of the upper cover plate or the lower cover plate at the second protrusion portion.

18. The backlight unit as claimed in claim 17, wherein the second protrusion portion is engaged with the third protrusion portion with a gap therebetween such that the heat dissipation unit is slidable between the upper cover plate and the lower cover plate.

19. A backlight unit, comprising:
a first reflector and a second reflector;
a supporting unit for supporting the second reflector;
an upper cover plate having first and second regions adjacent to each other in a horizontal direction for holding the first reflector at the second region;
a lower cover plate adjacent to the supporting unit, opposite to, and separate from the first region of the upper cover plate;
at least one light source disposed at least one portion of between the upper cover plate and the lower cover plate or between the upper cover plate and the supporting unit;
a heat dissipation unit disposed between the upper cover plate and the lower cover plate for dissipating heat from the light source, the heat dissipation unit being supported by the lower cover plate; and
an optical member supported by the upper cover plate,
wherein the heat dissipation unit includes:
an upper side being in contact with the upper cover plate at the first region;
a lower side being in contact with an upper side of the lower cover plate; and an inner side being in contact with the upper side and the lower side of the heat dissipation unit and for holding the light source.

20. A display device, comprising:

a display panel; and a backlight unit for irradiating a light to the display panel, wherein the backlight unit includes:

- a first reflector and a second reflector;
- at least one light source disposed between the first reflector and the second reflector;
- an upper cover plate and a lower cover plate separate from each other;
- a heat dissipation unit for holding the light source and being disposed between the upper cover plate and the lower cover plate to dissipate heat from the light source, the heat dissipation unit being supported by the lower cover plate; and
- an optical member supported by the upper cover plate.

\* \* \* \* \*